United States Patent [19]

Falzoni

[11] Patent Number: 4,756,072

[45] Date of Patent: Jul. 12, 1988

[54] UNIVERSAL PRESS TO PROCESS AND/OR FOR THE APPLICATION OF SMALL ITEMS

[75] Inventor: Pierino Falzoni, Cilavegna, Italy

[73] Assignee: Officina Meccanica Fratelli Falzoni s.r.l., Rome, Italy

[21] Appl. No.: 738,946

[22] Filed: May 29, 1985

[30] Foreign Application Priority Data

Jun. 21, 1984 [IT] Italy ................................ 21539 A/84

[51] Int. Cl.[4] .............................................. B23P 23/04

[52] U.S. Cl. .................................... 29/560; 29/26 A; 72/455; 83/574; 83/698; 408/137; 408/234

[58] Field of Search ................ 408/136, 137, 234, 236, 408/712; 29/26 R, 26 A, 26 B, 560; 72/448, 481, 455; 83/574, 685, 690, 698, 167; 100/231, 229, 218, 225; 144/92, 104

[56] References Cited

U.S. PATENT DOCUMENTS

| | | | |
|---|---|---|---|
| 123,886 | 2/1872 | Gardam et al. | 144/92 X |
| 1,088,002 | 2/1914 | White et al. | 100/231 |
| 1,209,650 | 12/1916 | Eisler | 408/234 |
| 1,404,126 | 1/1922 | Krause | 72/481 |
| 1,746,941 | 2/1930 | Hird | 29/26 A |
| 2,372,021 | 3/1945 | Seiden | 100/231 |
| 3,433,104 | 3/1969 | Milewski et al. | 409/233 X |
| 3,988,981 | 11/1976 | McDonald | 100/231 |

FOREIGN PATENT DOCUMENTS

| | | | |
|---|---|---|---|
| 2110924 | 9/1972 | Fed. Rep. of Germany | 408/712 |

*Primary Examiner*—Z. R. Bilinsky

*Attorney, Agent, or Firm*—Bucknam and Archer

[57] ABSTRACT

Universal press to process and/or for the application of small items such as stamping, drilling, die-punching, button-holing, riveting and similar operations, including: a base (19); a "C"-shaped structure (1) fixed to the said base; a hollow, vertical cylindrical body (2), to which the control device (4) is fixed and the support (9) of the moving tool (10), arranged at the end of the upper arm of the structure (1) and carriage (14), or (15) to support the fixed tool holders (12) complete with guides which match the coherent vertical guides (16) of the lower arm.

1 Claim, 2 Drawing Sheets

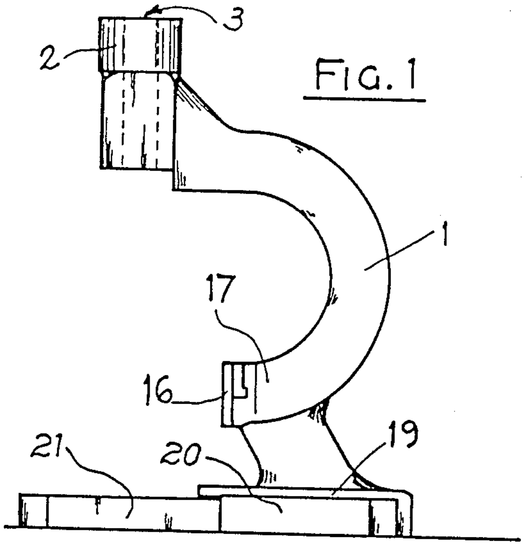
FIG. 1
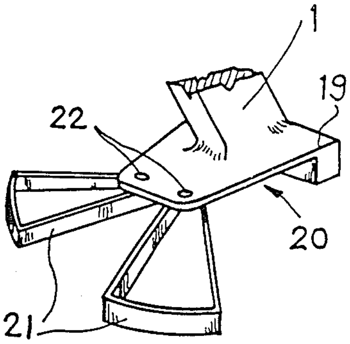
FIG. 2
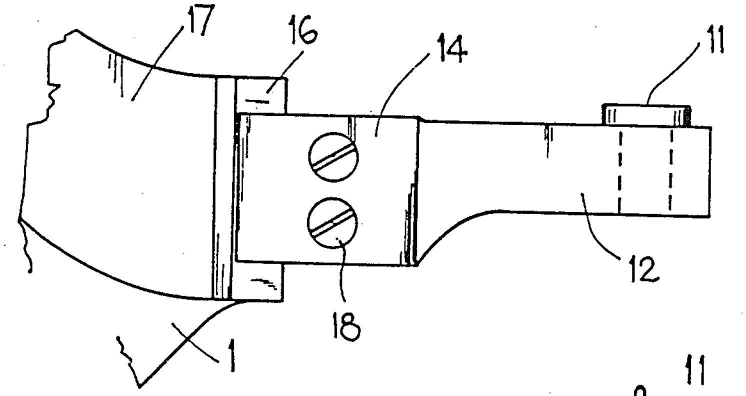
FIG. 3
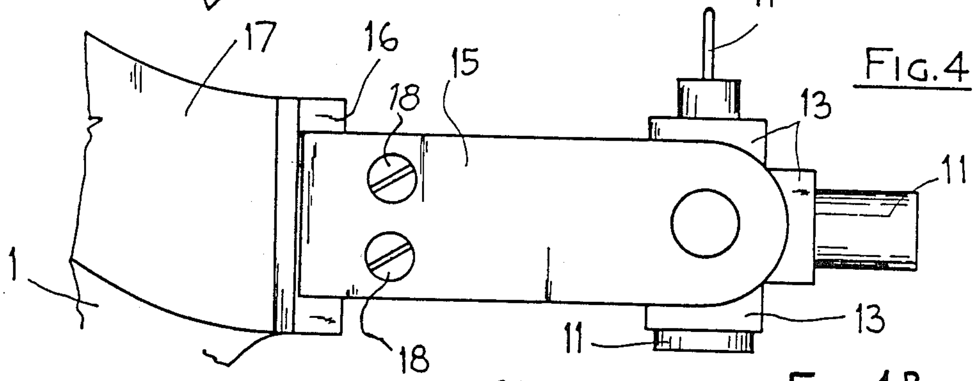
FIG. 4
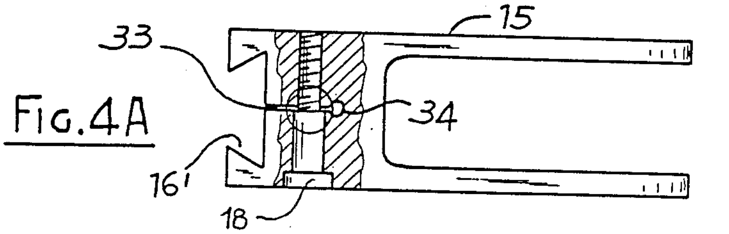
FIG. 4A
FIG. 4B
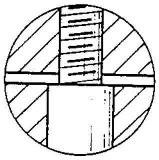

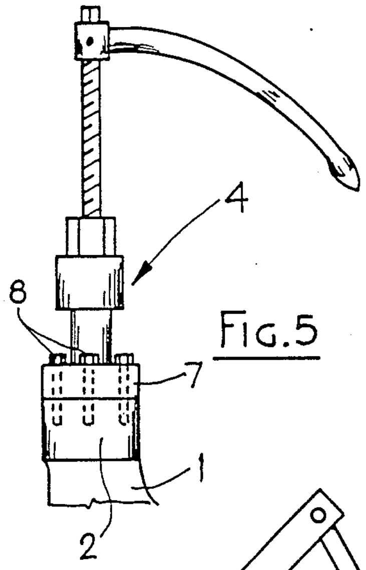
FIG. 5
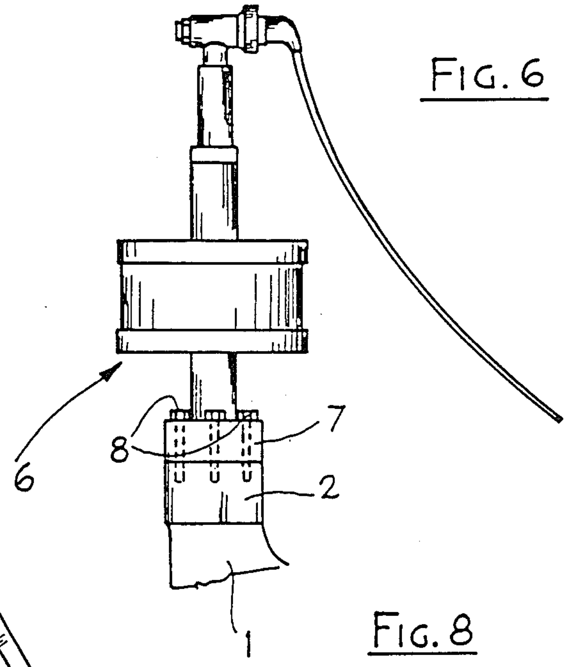
FIG. 6
FIG. 7
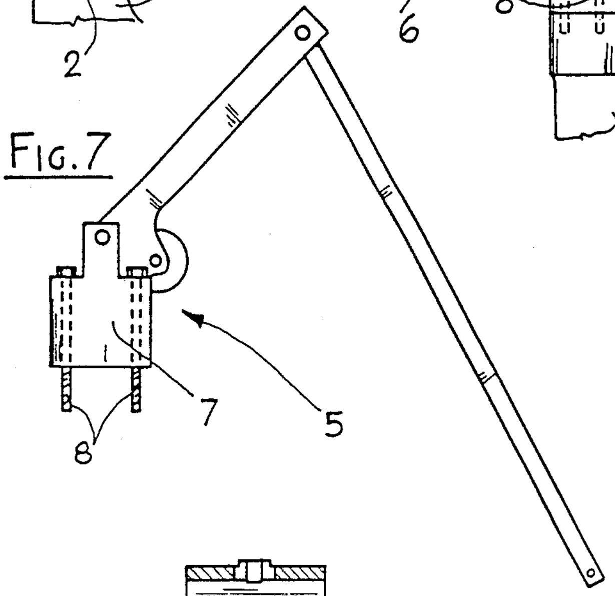
FIG. 8
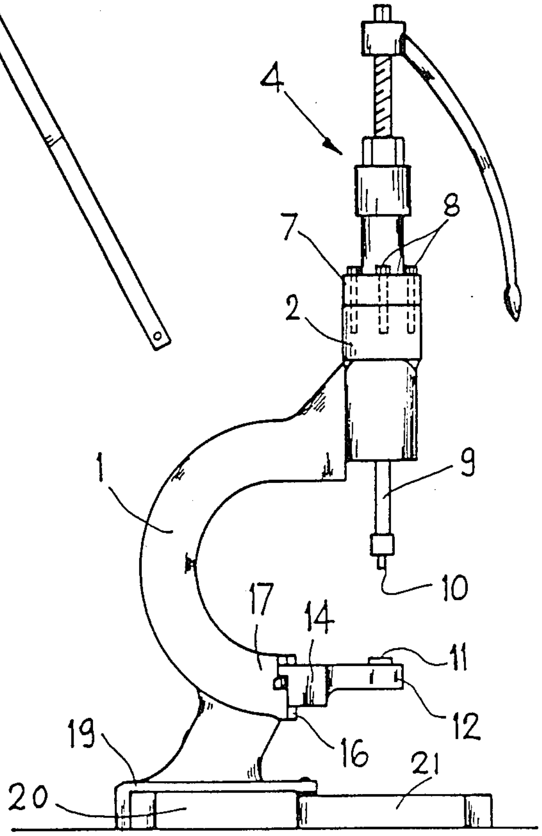
FIG. 8A
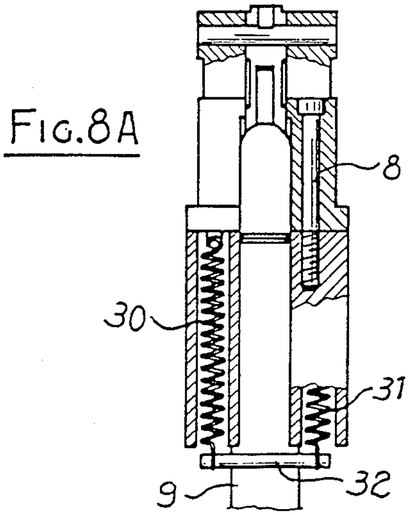

UNIVERSAL PRESS TO PROCESS AND/OR FOR THE APPLICATION OF SMALL ITEMS

BACKGROUND OF THE INVENTION

1. Field of the Invention

This invention refers to a universal press to process and/or for the application of small items.

In particular, this invention refers to a universal press capable of performing numerous operations, such as for example, stamping, drilling, die-punching, button-holing, riveting and similar operations, using a unique base.

2. Description of the Prior Art

Presses to perform the above mentioned operations are well known and available commercially. However, the known presses have several drawbacks and limitations mainly due to the fact that they were exclusively designed for manual operation. In addition, in the known presses the relative positioning between the fixed tool and the moving tool can not be achieved in a rationally satisfactory manner and in any case is difficult to achieve.

The exclusively manual service of the known presses frequently limits their compatibility in the operative cycle, as well as adding to the difficulties of the relative positioning between the fixed tool and the moving tool. These draw-backs increase the processing costs, as well as the production costs of the presses themselves.

SUMMARY OF THE INVENTION

One object of this invention is to provide a press that overcomes the various drawbacks and limitations of the known presses.

More in particular, an object of this invention is to provide a press that makes it possible to perform numerous different operations using a single base on which the holders for the fixed and moving tools are replaced as required. A further object of this invention is that of providing a press to which different types of control means may be associated.

A further object of this invention is to provide a universal press, having a simple structure, which is easy to use, is highly versatile and is reasonably economical.

The applicant has now found out, and it is the subject of this invention, that these and other purposes are achieved by a universal press to process and/or for the application of small items, including a base, a structure fixed to the base that is essentially "C"-shaped with arms protruding from the base, and interchangeable supports for the fixed and moving tools, arranged in correspondence to the end of the arms, where the end of the lower arm is completed with vertical support guides, preferably dove-tail and the fixed tools are mounted on support carriages that in turn also have dove-tail guides which match the coherent vertical guides of the lower arm.

The upper end of the structure, preferably consists of a hollow, vertical cylindrical body, on the upper part of which the supports for the mobile tools are flanged, complete with their manual, pedal, pneumatic and possibly electric moving means.

At least one, or preferably two drawers are positioned in the foot of the base, which project therefrom, or fit therein by rotating about vertical pins fixed to the said base.

BRIEF DESCRIPTION OF THE DRAWINGS

In order to provide an easier understanding of the structure of the universal press, which is the subject of this invention, a detailed description is provided here with reference to the figures of the attached drawings that represent a preferred, exemplary, but non-limitative embodiment of this invention, where:

FIG. 1 represents a side elevational view of the base of the universal press in accordance with this invention;

FIG. 2 is a perspective view of the small drawers arranged in the foot of the base, shown in the open position;

FIGS. 3 and 4 represent schematic side views of two support carriages of the fixed tools applied to the support guides, of which, the one in FIG. 3 is a simple type and the one of FIG. 4 is fitted with multiple, or revolver type heads;

FIG. 4A represents a schematic top plan view, with sectioned parts, of the carriage of FIG. 4 without the multiple heads;

FIGS. 5, 6 and 7 represent side elevational views of control devices for the moving tools, manual, pneumatic and pedal-operated type respectively which may be applied to the end of the upper arm;

FIG. 8 represents a schematic view of one embodiment of this universal press fitted with a moving tool having manual control, aligned with the corresponding fixed tool and FIG. 8A represents a schematic view of a cross-section of the assembly means of the manual control for the moving tool at the end of the upper arm, as schematically illustrated in FIG. 8.

DESCRIPTION OF THE PREFERRED EMBODIMENTS

Referring first to FIG. 1 the universal press, which is the subject of this invention, includes a base 19 that supports a structure 1 which is essentially "C"-shaped and has arms which protrude from the base 19.

The upper end of the structure 1 is fitted with a vertical, hollow body 2, having its upper surface 3 flange-shaped and several threaded holes. Control devices of the moving tools are fixed to the upper surface 3 as required and as a function of the processing requirements.

Each of the control devices, which may be manual as shown in FIG. 5 at 4, pedal-operated as shown in FIG. 6 at 5, pneumatic as shown in FIG. 7 at 6, or electric (not illustrated) is fitted with a flange 7, that matches with the upper surface 3 of the hollow cylindrical body 2 and is fixed to it by means of screws 8 (see FIGS. 5 to 8). The above mentioned control devices 5 to 7 are of a known type and hence are not described in detail here, even though an example of a manual control device 4 is schematically illustrated in FIG. 8A. As may be seen in FIG. 8A, this control device 4 includes return springs 30 and 31 anchored to a pin 32 fixed transversally to the support 9, which holds, or supports the moving tool 10.

The devices 4,5,6 are used to displace the supports 9 for the moving tools 10 in a vertical direction, against the effect of the springs 30 and 31. The latter return the support 9 to the rest position. The moving tools 10 may be mounted on conventional single supports, as indicated at 9 in FIG. 8, or may be mounted on multiple revolver type supports. In the same way the fixed tools 11 may be mounted on single supports 12 as shown in FIG. 3, or on multiple, or revolver type supports 13 as shown in FIG. 4. The single supports 12, or multiple supports 13 are in turn mounted on supporting carriages 14, or 15. The carriages 14 and 15 are fitted with rear dove-tail guides 16' (see FIG. 4A) which allow them to be inserted, clamped and positioned on the vertical guides 16, which are also dove-tailed and are provided at the lower end of the structure 1. The carriages 14 and 15 are designed to ensure perfect alignment, as well as vertical adjustment of the fixed tools 11 mounted on them with respect to the moving tools 10 held by the supports 9.

The carriages 14 and 15 have a side slit 33 terminating with a cavity 34 in order to clamp and accurately adjust the distance between the fixed tools 11 and the moving tools 10 and their working stroke.

Once the distance between the two tools 10 and 11 has been adjusted via the vertical displacement of the carriage 14, or 15, the latter is clamped to the guide 16 using side screws 18 which pass through the slit 33 reducing the opening. As shown in FIG. 2, the foot of the base 19 has two side cavities 20 in which two drawers 21 are inserted. The drawers 21 are pivoted on vertical pins 22 fixed to the base 19 and revolve about the pins 22, protruding fully until reaching a position close to and beneath the working axis of the fixed and moving tools 11 and 10. The drawers 21 contain the small items to be used and facilitate the supply and loading operations of the press. In the rest condition, the drawers 21 are returned inside the foot of the base 19. As may be noted from the illustrations and description, structure 1 with its "C" shape allows any matching arrangement to be achieved and the respective adjustment of the moving tool, or tools 10 and corresponding fixed tool, or tools 11, with any type of movement control in a rapid and simple manner.

In this way it is possible to achieve a significant saving in the operating cycle of the press. Furthermore, with numerous fixed and moving tool pairs 11 and 10, it is possible to perform any type of working, or application of small items, such as for example stamping, drilling, die-punching, button-holing, riveting and similar operations using a single press. The most common versions obtainable using this invention are represented by the economic, or single tool version and by the revolver version with several tools, both versions having a manual, pedal, pneumatic, or possibly electric control. In addition, each of these versions may be completed with conventional type supplements, such as for example hand guards, projectors and other accessories. While this invention has been illustrated and described in accordance with a preferred embodiment, in its practical embodiment, various changes and modifications to the structure, to the supports of the movement controls for the moving tools and to the supporting carriages for the fixed tools, may be made without by so doing leaving its protective scope.

What I claim is:

1. A universal press for stamping, drilling, die-punching, button-holing, riveting small items by means of a moving tool or a fixed tool comprising an horizontal base, a support structure affixed to said base and extending therefrom in a direction substantially perpendicular thereto, said support structure having a substantially C-shaped configuration and including two vertical arms, the first arm being closer to said base and having an end portion, said end portion having a vertical support guide, said support guide having a configuration, the second arm being the upper arm, said upper arm having an end portion, at least one carriage having an engagement portion having a configuration complementary to that of said support guide for mounting said carriage on said guide, means for arresting said carriage in any selected position along said guide; at least one fixed tool mounted on said carriage; at least one movable tool; means for mounting said movable tool on said end portion of said upper arm for movement away from and toward said fixed tool; said carriage having a side slit terminating in a cavity to adjust the distance between said fixed tool and said moving tool, wherein said base has a foot, said foot has at least two laterally open cavities; and further comprising at least two containers for small items, at least two vertical pins fixed to said base, said containers being pivoted on said pins and revolving about said pins, between a rest position in which said drawers are received in the interior of the foot of said base and a second position in which the drawers are located beneath the working axis of the fixed tool and the movable tool.

* * * * *